United States Patent [19]
Riedel

[11] 3,998,006
[45] Dec. 21, 1976

[54] MULTIPLE PURPOSE AGRICULTURAL WEED SUPPRESSANT AND GROWTH ENHANCEMENT BLANKET

[75] Inventor: Frederick H. Riedel, Cloquet, Minn.
[73] Assignee: Conwed Corporation, St. Paul, Minn.
[22] Filed: Feb. 19, 1976
[21] Appl. No.: 659,287
[52] U.S. Cl. .................................. 47/9; 47/26; 47/32
[51] Int. Cl.$^2$ .................................. A01G 7/00
[58] Field of Search .................... 47/9, 26–27, 47/32, 25, 56

[56] References Cited
UNITED STATES PATENTS

| | | | |
|---|---|---|---|
| 1,930,939 | 10/1933 | Horner | 47/9 |
| 3,287,850 | 11/1966 | Da Valle | 47/9 |
| 3,305,969 | 2/1967 | Mattson | 47/25 |
| 3,353,297 | 11/1967 | Gervals | 47/9 X |
| 3,555,728 | 1/1971 | Herns | 47/9 |
| 3,557,491 | 1/1971 | Franklin et al. | 47/9 X |
| 3,755,965 | 9/1973 | Emery | 47/27 |
| 3,810,328 | 5/1974 | Bryan et al. | 47/9 |
| 3,857,195 | 12/1974 | Joanson | 47/32 |
| 3,955,319 | 5/1976 | Smith | 47/9 |

*Primary Examiner*—Robert E. Bagwill
*Attorney, Agent, or Firm*—Eyre, Mann, Lucas & Just

[57] ABSTRACT

A dark perforated flexible plastic sheet bonded on top of a fertilizer-containing cellulosic fiber blanket in contact with the earth shields the blanket and the soil beneath from the drying effects of the free circulation of air while allowing entry of water. The fiber blanket is composed of cellulosic fiber mat. The fiber mat rests upon the ground thereby discouraging growth in the areas of contact. Spaces for plant growth are provided between adjacent areas of fiber blanket. Plant growth is encouraged in these spaces by the absorption of solar energy by the plastic film transmitted to the earth beneath, the moisture in the blanket by the unperforated areas of the plastic sheet and by the release of fertilizer from the adjacent fiber mat as the moisture leaves the blanket and enters the soil.

A second embodiment of the invention includes the continuation of the plastic sheet over the space between adjacent area of fiber blanket. A miniature greenhouse is thus formed in the intermediate areas which encourage plant germination and growth.

The fiber is plowed into the ground at the end of the growing season after stripping off the plastic sheet. The plowed-in fiber improves the soil by adding to its organic content.

17 Claims, 3 Drawing Figures

MULTIPLE PURPOSE AGRICULTURAL WEED SUPPRESSANT AND GROWTH ENHANCEMENT BLANKET

BACKGROUND OF THE INVENTION

The prior art contains agricultural techniques designed to promote the growth of plants. For example, U.S. Pat. No. 3,845,584, in the name of Frank B. Mercer, teaches the use of a bi-level plastic net bonded atop an impermeable plastic sheet for growing grass. U.S. Pat. No. 3,863,388 teaches a similar bi-level net and impermeable sheet upon which a layer of rooting medium containing seed may be spread and which thereupon encourages germination and growth of the seeds.

The use of dark plastic sheeting spread over the ground has been found to retard plant growth. Whenever holes or tears occur in the sheeting, as commonly happens in outdoor use, plants tend to grow through the openings thus created. In addition, the fully impermeable sheet cuts off water entry to the areas covered by it.

The prior art fails to disclose a multiple purpose blanket which simultaneously discourages unwanted growth while encouraging desireable plants.

SUMMARY OF THE INVENTION

The present invention teaches a method of encouraging the growth of desireable plants and discouraging the growth of others. Strips of fiber blanket, having a perforated dark plastic film bonded to the upper side, are placed on the ground between rows of plants. The perforations in the plastic sheet which can be holes or slits allow the entrance of rain or aritificially distributed water to the cellulosic blanket. Plant stalks are free to emerge into the sunshine in the regions between the strips. Fertilizer, which can be configured in a "time-release" encapsulation, is preferably present within the fiber blanket and is released over the germination and maturation time of the plants. The strips, of dense, wet fiber blanket being in direct contact with the soil, tend to discourage weed growth.

An alternate embodiment contains areas under the plastic sheet from which the fibrous mat is omitted. In these areas, the greenhouse effect produced by the plastic preferably a dark plastic such as black polyethylene suspended over the space from which the fibrous mat is omitted encourages the germination and growth of desired plants in these areas. The intermediate unperforated areas of dark plastic overlaying the soil and the fibrous blanket retards evaporation of moisture. The desired plants emerge through the holes or slits in the plastic film.

After harvest at the end of a growing season, the dark plastic sheet is stripped off, leaving the fiber blanket in place. The next time the soil is turned over, the fiber becomes mixed with the soil to improve its porosity and water retaining properties. The stripped off plastic sheet can be used in the next growing season to tie up crops such as tomatoes.

The attached fiber blanket, especially when saturated with water, reduces the tendency of the plastic sheet to be blown away by the wind.

These and other features of the invention are more fully illustrated in the following detailed description of one selected embodiment of the invention.

DETAILED DISCLOSURE OF THE PREFERRED EMBODIMENT

Figure 1:
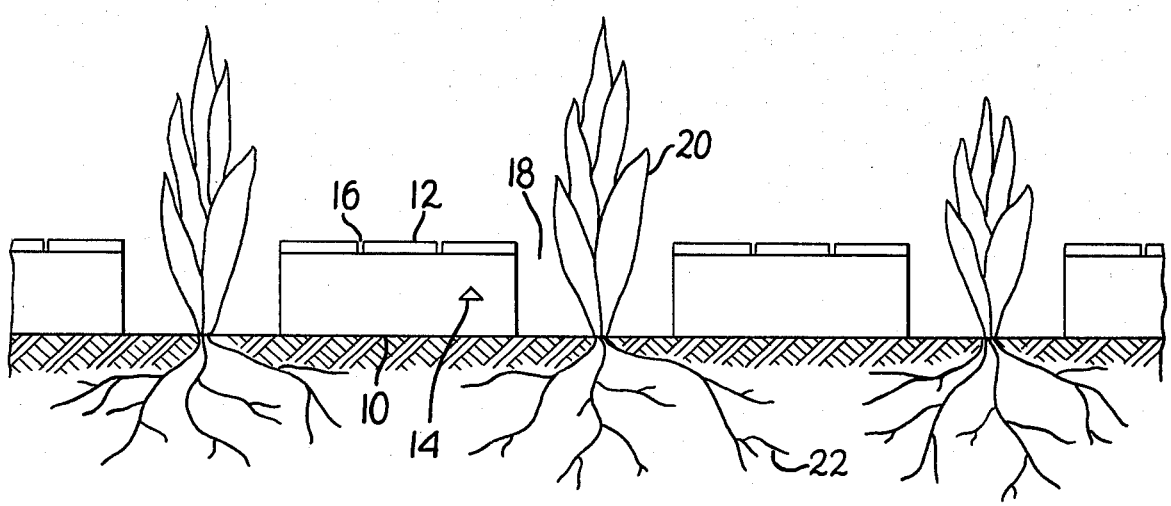
FIG. 1 shows a side elevation of an embodiment of the invention.

Referring now to the side elevation of the embodiment of the invention shown in FIG. 1, a porous, absorbent flexible fiber blanket 10 is bonded to the under side of a flexible plastic sheet 12. The fiber blanket 10 can be of any thickness but is preferably in the range of ¼ to ½ inch. The fiber blanket preferably comprises at least 50% by volume cellulosic fibers. Typical suitable cellulosic fibers include trees such as aspen, pine and spruce, other primary fibers such as sisal, jute and the like and secondary fibers from items such as kraft paper, disposable diapers and the like. The fibers are bonded together, by any one of various processes well known in the art, to form a cohesive, porous, absorbent, flexible mass. Typical of such blankets is the one sold under the trademark TUFFLEX by Conwed Corporation of St. Paul, Minnesota.

In the preferred embodiment, particles of chemical fertilizer 14 or other water soluble soil-conditioning agents such as lime are embedded in the fiber blanket at the time of its manufacture. The chemical fertilizer 14 can be instantly released upon receiving moisture or it can be gradually released over a growing season. Combinations of instant release and delayed release formulations of the same or different materials are readily seen by one skilled in the art to be encompassed within the inventive scope of this disclosure.

The plastic sheet 12 can be made of any relatively impermeable flexible material such as polyvinyl chloride, polyethylene or other polyolefin but is preferably of black polyethylene. The plastic sheet 12 can be of any thickness but is preferably in the range of ½ to 1 mil. The plastic sheet 12 is perforated by a plurality of small holes 16. The ratio of hole 16 area to plastic 12 area can be varied by varying hole size and spacing to accommodate differences in growing area and crops. As the hole 16 area increases, there is greater ventilation and moisture release but improved water entry is also provided. The holes can suitably range in size from about 1/16 to about 3/8 inches in diameter and should occupy from about 5% to about 25% of the area of the plastic sheet. The fiber blanket 10 and attached plastic sheet 12 is applied to the ground in strips leaving spaces 18 between adjacent strips for the growth of plants. Where the fiber blanket 10 is in contact with the earth, experience has shown that plant growth, especially broadleaf, is discouraged. In the inter-strip spaces 18 however, the plants 20 are free to emerge into the sunshine. The black plastic sheet 12 absorbs and transmits a large percentage of the incident insolation while retarding the evaporation of moisture. Liquid water incident on the top of the plastic sheet 12 is readily able to penetrate the holes 16 and saturate the fiber blanket 10 and the adjacent soil. The moisture retained by the fiber blanket 10 is available to the plants 20 by sidewise capillary migration tooward the open space 18 and also by downward capillary migration to reach the side-spreading plant roots 22 underlaying the fibrous blanket 10. Thus the growth of plants in the inter-strip spaces 18 is encouraged. Germination and growth are further encouraged by the diffusion into the soil of the fertilizer and/or soil conditioning agent 14, if present, from the fiber blanket 10.

The fiber blanket may be attached to the plastic sheet in any suitable fashion including staples, surface melting of the plastic sheet, "sandwiching" with a net, adhesives or the like. It is preferred that adhesives be used since they will bond the fiber blanket uniformly to the plastic sheet. Because of the desire for the plastic sheet to be bonded to the fibers, it is preferable to use an adhesive that is no more than minimally affected by water for attaching the plastic sheet to the fiber strips. Suitable adhesives include phenolics, polyvinyl acetate, melamines, latexes and the like.

Figure 2:
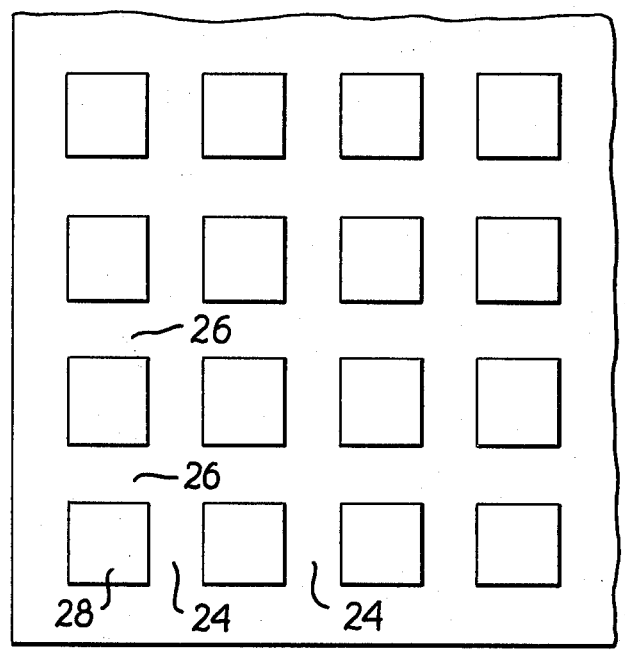
FIG. 2 shows a plan view of an embodiment of the invention in which spaced strips are interconnected.

The width and spacing of the fiber strips with attached plastic sheet will vary widely depending upon the particular application to which the product is to be put. In general, however, the fiber strips will be from about 8 to about 18 inches in width and the spacing between adjacent fiber strips will be from about 2 to 12 inches. Similarly, when dealing with plants which are spaced relatively far apart such as tomatoes, the strips may be joined together by other strips. As shown in FIG. 2, this can be accomplished by simply making suitable sized perforations 28 in a larger sheet of fibrous material resulting in strips 24 and crossing strips 26. Similarly the strips of fibrous material could be disconnected successive pieces of material resembling the cut out areas of FIG. 2.

The weight of the fiber blanket 10 and especially its ability to absorb water provides means for helping to hold the assembly in place. After installation, the assembly is preferably immediately watered. The fiber blanket 10, becoming water soaked, provides sufficient mass to hold down the assembly against normal winds.

At the end of the growing season, the plastic sheet 12 is suitably stripped off the sodden fiber mass. In order to promote this separation, the wood fiber blanket 10 is preferably made with a hydrophillic binder such as starch or a latex. When this is wetted it will hold together well enough to prevent lifting of the plastic by the wind in most cases, yet it will permit rolling off of the plastic at the end of the season with only a minimum of wood fibers adhered thereto. The remaining fiber mass may thereupon be plowed into the soil to improve the soil condition. The removed plastic sheet 12 may be saved until the next growing season for such uses as tieing up plants.

Figure 3:
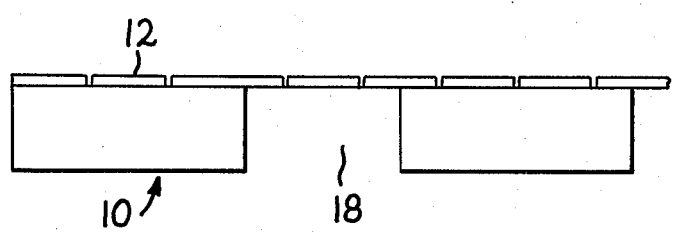
FIG. 3 shows an embodiment of the invention in which the plastic sheet spans intermediate areas.

An alternate embodiment of the invention is shown in FIG. 3. The plastic sheet 12 in this embodiment is bonded to at least two contiguous sections of fibrous mat 10. The fibrous mat 10 may be in strips as described in connection with FIG. 1 or may have the inerconnected configuration of FIG. 2. The plastic sheet 12 spans the intermediate area 18 creating a miniature greenhouse conducive to plant growth. The black plastic sheet absorbs and transmits a large percentage of the incident insolation while retarding the evaporation of moisture from the intermediate areas. Liquid water incident on the top of the plastic sheet 12 is readily able to penetrate the holes 16 and saturate the fiber blanket 10 and the adjacent soil. Thus growth of plants in the inter-strip spaces 18 is encouraged by the tropical atmosphere generated in the miniature greenhouse. As the small plants emerge from the soil and grow upward, they readily emerge through the holes 16. Once beyond the holes 16, plant leaves can carry on the normal process of photosynthesis. Meanwhile, the plastic sheet 12 and fiber blanket continue to retain moisture and provide fertilizer to the roots and to suppress competing weeds in its area of contact with the soil.

It will be understood that the claims are intended to cover all changes and modifications of the preferred embodiments of the invention, herein chosen for the purpose of illustration which do not constitute departures from the spirit and scope of the invention.

What is claimed is:
1. An agricultural growth control device comprising:
 a. a flexible, substantially light impermeable sheet containing a plurality of openings; and
 b. fibrous blanket material affixed to said impermeable sheet, said fibrous blanket material being at least 50% by volume cellulosic fibers and, the bottom of said fibrous blanket material being adapted to laying upon the earth, said fibrous blanket material being affixed to said sheet in a discontinous manner whereby certain portions of the sheet overlie the earth without intervening fibrous blanket material therebetween, whereby a plurality of miniature greenhouses are formed.
2. The device as recited in claim 1 wherein said fibrous blanket material is bonded to the underside of said sheet with adhesive.
3. The device as recited in claim 1 wherein said fibrous blanket material comprises wood fibers.
4. The device as recited in claim 1 wherein said fibrous blanket material contains fertilizing agents.
5. The device as recited in claim 4 wherein at least some of said fertilizing agents are of an instant release formulation.
6. The device as recited in claim 4 wherein at least some of said fertilizing agents are of a delayed release formulation.
7. The device as recited in claim 1 wherein said fibrous blanket material contains soil conditioning agents.
8. The device as recited in claim 1 said sheet being separable from said fibrous blanket material at the end of a growing season whereby said fibrous blanket material may be plowed into the soil to aid in conditioning the soil.
9. The device as recited in claim 1 wherein said fibrous blanket material is arranged in parallel strips, with said greenhouses lying therebetween.
10. The device as recited in claim 1 wherein said fibrous blanket material is in grid form, with said greenhouses being spaced from one another.
11. An agricultural growth control method comprising: placing the device of claim 1 upon seeded earth, whereby seeds which germinate in soil beneath said greenhouses emerge and pass through one of said openings.
12. A method as recited in claim 11 further comprising treating said fibrous blanket material with fertilizer.
13. A method as recited in claim 12 wherein said fertilizer is comprised of an instant release formulation.
14. A method as recited in claim 12 wherein said fertilizer is comprised in part of a delayed release formulation.
15. A method as recited in claim 11 further comprising:
 a. removing said substantially impermeable sheet once its functions have been performed; and b. plowing said remaining fibrous blanket material into the soil whereby the soil condition is improved.

16. An agricultural growth control method comprising:
   a. placing strips of fibrous blanket material comprising at least 50% of cellulosic fibers in contact with the soil, said strips being separated by spaces;
   b. said fibrous blanket material and spaces being covered with a polyethylene sheet containing holes of about 1/16 to about ⅜ inches in diameter and occupying from about 5% to about 25% of the area of said sheet;
   c. there being fertilizer material in said fibrous blanket material; and
   d. said polyethelene sheet being bonded to said fibrous blanket material, said bonding being adapted to release after a predetermined amount of wetting.

17. An agricultural growth control device comprising:
   a. a flexible black polyethylene plastic sheet, the thickness of said such sheet being between ½ and 1 mil, the perforations in said black polyethylene plastic sheet being of 1/16 to ⅜ inches diameter and spaced to provide 5 to 25 percent open area;
   b. fibrous material comprised of at least 50% by volume of cellulosic fibers affixed by bonding means to the underside of said polyethylene sheet, the bottom of said fibrous material being adaptable to laying upon the earth said fibrous blanket material being bonded to said sheet in a discontinuous manner whereby certain portions of the sheet overlie the earth without intervening fibrous blanket material therebetween, whereby a plurality of miniature greenhouses are formed;
   c. fertilizing agents embedded within said fibrous material; and
   d. said bonding means being adapted to release said sheet from said fibrous material after a predetermined amount of wetting of said device.

* * * * *